US006556064B1

(12) United States Patent
Yatabe (10) Patent No.: US 6,556,064 B1
(45) Date of Patent: Apr. 29, 2003

(54) VOLTAGE BOOSTING CIRCUIT AND METHOD

(75) Inventor: Satoshi Yatabe, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/520,787

(22) Filed: Mar. 8, 2000

(30) Foreign Application Priority Data

Mar. 11, 1999 (JP) .......................................... 11-065217

(51) Int. Cl.[7] ................................................ H02M 3/18
(52) U.S. Cl. ........................ 327/536; 327/537; 307/110; 363/60
(58) Field of Search .............................. 327/535, 536, 327/537; 307/110; 363/59, 60

(56) References Cited

U.S. PATENT DOCUMENTS

| 3,824,447 | A | | 7/1974 | Kuwabura | 363/60 |
|---|---|---|---|---|---|
| 5,051,882 | A | | 9/1991 | Grimm et al. | 363/60 |
| 5,444,310 | A | * | 8/1995 | Kataoka et al. | 307/110 |
| 5,463,542 | A | | 10/1995 | Okamoto | 363/60 |
| 5,532,916 | A | * | 7/1996 | Tamagawa | 307/110 |
| 5,606,491 | A | * | 2/1997 | Ellis | 363/60 |
| 5,668,710 | A | * | 9/1997 | Caliboso et al. | 363/60 |
| 5,870,295 | A | | 2/1999 | Watanabe | 363/60 |

FOREIGN PATENT DOCUMENTS

| JP | A-63-157667 | 6/1988 | H02M/3/07 |
|---|---|---|---|
| JP | A-4-91656 | 3/1992 | H02M/3/07 |
| JP | A-6-327236 | 11/1994 | H02M/3/07 |

* cited by examiner

Primary Examiner—Timothy P. Callahan
Assistant Examiner—Terry L. Englund
(74) Attorney, Agent, or Firm—Oliff & Berridge, PLC (57) ABSTRACT

A voltage booster method and circuit reduce the number of capacitors required for a voltage boost. First, a first terminal of a first auxiliary capacitor is connected to a ground line and a second terminal of the first auxiliary capacitor is connected to the supply line of an input voltage. Second, a first terminal of a second auxiliary capacitor is connected to the ground line, the first terminal of the first auxiliary capacitor is switched to the supply line of the input voltage, and the second terminal of the first auxiliary capacitor is switched and connected to a second terminal of the second auxiliary capacitor. Third, the first terminal of the second auxiliary capacitor is switched to the second terminal of the first auxiliary capacitor, and the second terminal of the second auxiliary capacitor is switched and connected to the output line.

7 Claims, 9 Drawing Sheets

VOLTAGE BOOSTING CIRCUIT AND METHOD

BACKGROUND OF THE INVENTION

1. Field of Invention

The present invention relates to voltage booster circuits and voltage boosting methods which reduce the number of charge-accumulating devices required for a voltage boost and electronic units using the output of such a voltage booster circuit as a power source.

2. Description of Related Art

In liquid-crystal display apparatuses, for example, a high-voltage power source is required to drive liquid-crystal devices in order to obtain successful display characteristics. Therefore, a power-source circuit used in the liquid-crystal display apparatuses is configured such that an input voltage is boosted by a voltage booster circuit and the boosted voltage is supplied to a driving circuit for driving the liquid-crystal devices and to other circuits.

Figure 13:
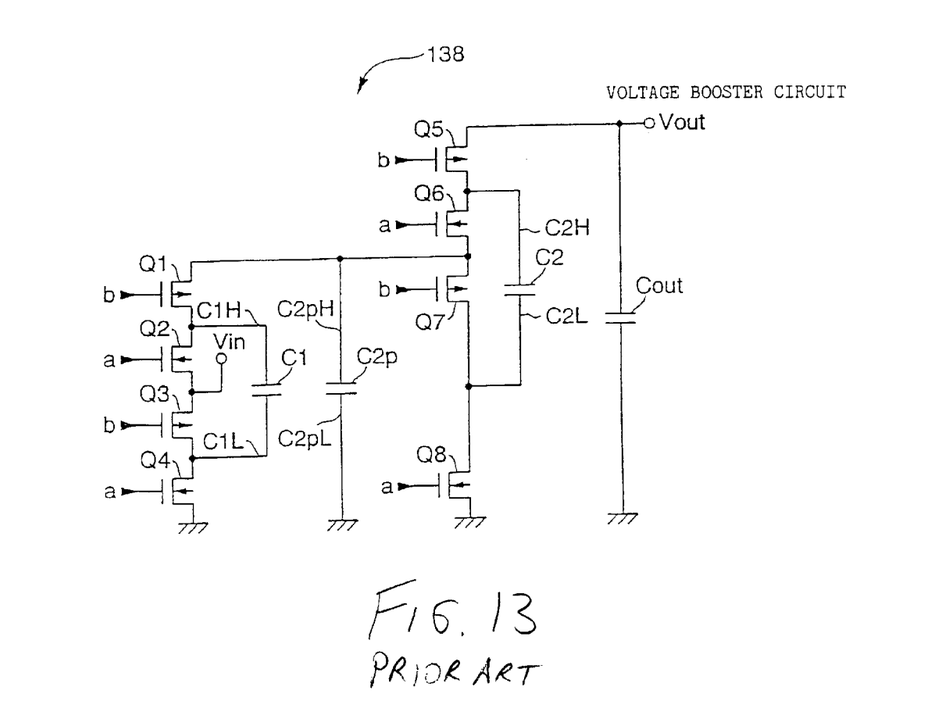
FIG. 13 is a circuit diagram showing the configuration of a conventional voltage booster circuit.

The configuration of a conventional voltage booster circuit will be described below for a case in which a voltage-boost magnification set to four is taken as an example. FIG. 13 is a circuit diagram showing the configuration of a voltage booster circuit 138 in this case. The voltage booster circuit 138 is formed of transistors Q1 to Q8, auxiliary capacitors C1, C2, and C2p, and an output capacitor Cout.

Figure 14:
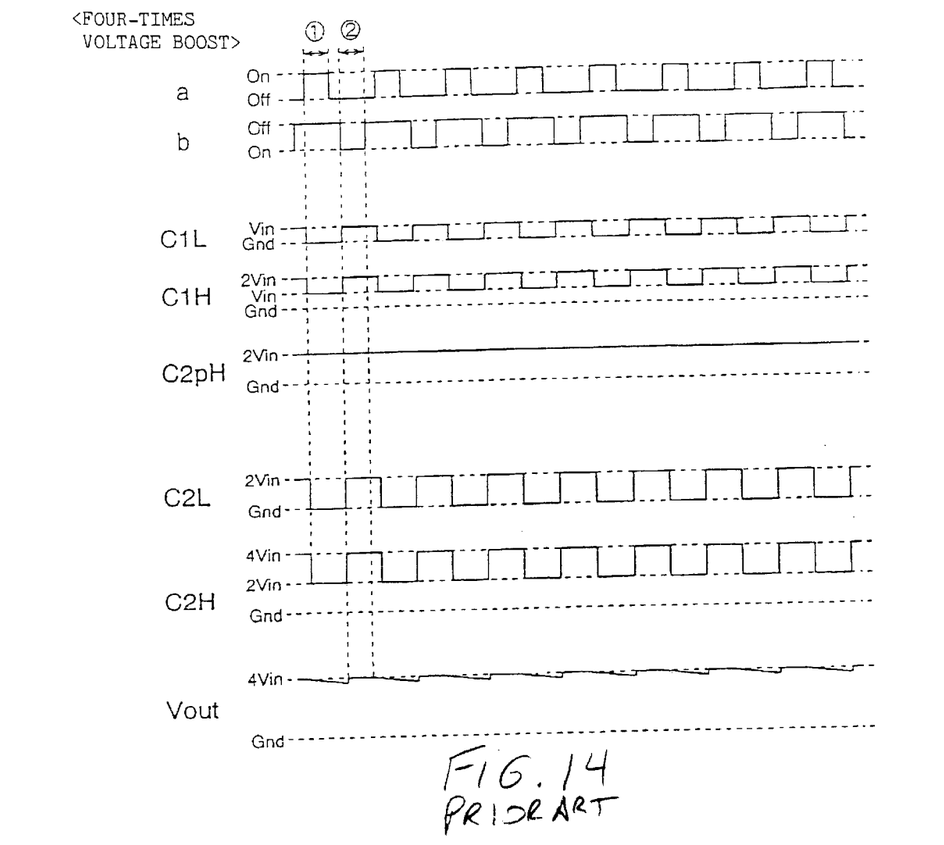
FIG. 14 is a timing chart showing control signals for a four-times voltage boost in the conventional voltage booster circuit.

FIG. 14 is a timing chart of control signals sent to the voltage booster circuit 138. A control signal "a" shown in this figure is generated by narrowing the pulse width of a control signal "b," and is sent to n-channel transistors Q2, Q4, Q6, and Q8 in the voltage booster circuit 138 as gate signals. A control signal "b" is supplied to p-channel transistors Q1, Q3, Q5 and Q7 of the voltage-booster circuit 138 as the gate signal.

Figure 15:
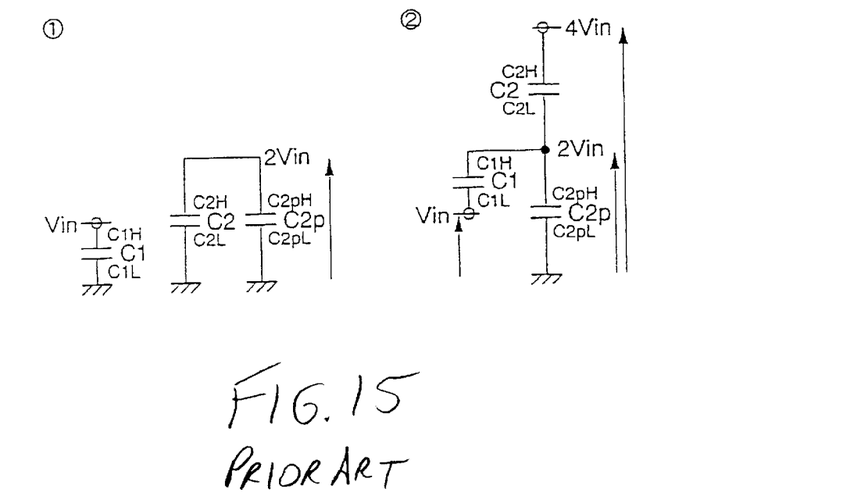
FIG. 15 is an operational view for the four-times voltage boost in the conventional voltage booster circuit.

When the control signals "a" and "b" are sent to the voltage booster circuit 138, transistors Q2, Q4, Q6, and Q8 are turned on whereas the other transistors are turned off in a period indicated by ① in FIG. 14, that is, a period in which only the control signal "a" has an "H" level. Therefore, the auxiliary capacitor C1 is charged with an input voltage Vin since a terminal C1H is connected to the supply line of the input voltage Vin and a terminal C1L is connected to the ground line, as shown in ① of FIG. 15. The auxiliary capacitor C2 is connected in parallel to the auxiliary capacitor C2p charged with 2 Vin, in a period indicated by ②, and is charged. After these operations, all the transistors Q1 to Q8 are turned off temporarily.

In a period indicated by ② in FIG. 14, that is, a period in which both control signals "a" and "b" have an "L" level, transistors Q1, Q3, Q5, and Q7 are turned on whereas the other transistors are turned off. Therefore, as shown in ② of FIG. 15, since the terminal C1L of the auxiliary capacitor C1 is switched and connected to the supply line of the input voltage Vin and the terminal C1H is disconnected from the supply line of the input voltage Vin, the potential of the terminal C1H becomes 2 Vin, which is offset from the input voltage Vin to a higher potential by the output voltage Vin of the auxiliary capacitor C1. On the other hand, since a terminal C2pH of the auxiliary capacitor C2p is connected to the terminal C1H, the auxiliary capacitor C2p is charged with a potential difference of 2 Vin. Therefore, the potential of the terminal C2pH becomes 2 Vin in the period ‡A. In addition, since the terminal C1H is connected to a terminal C2L of the auxiliary capacitor C2, which has been charged with 2 Vin in the period ‡A, the potential of the terminal C2H of the auxiliary capacitor C2 becomes 4 Vin, which is offset from the potential of the terminal C1H (C2pH, C2L), 2 Vin, to a higher potential by the output voltage 2 Vin of the auxiliary capacitor C2. And then, the potential is smoothed by the output capacitor Cout. With the periods ① and ② being repeated in this way, the input voltage Vin is boosted four times and outputted.

Figure 16:
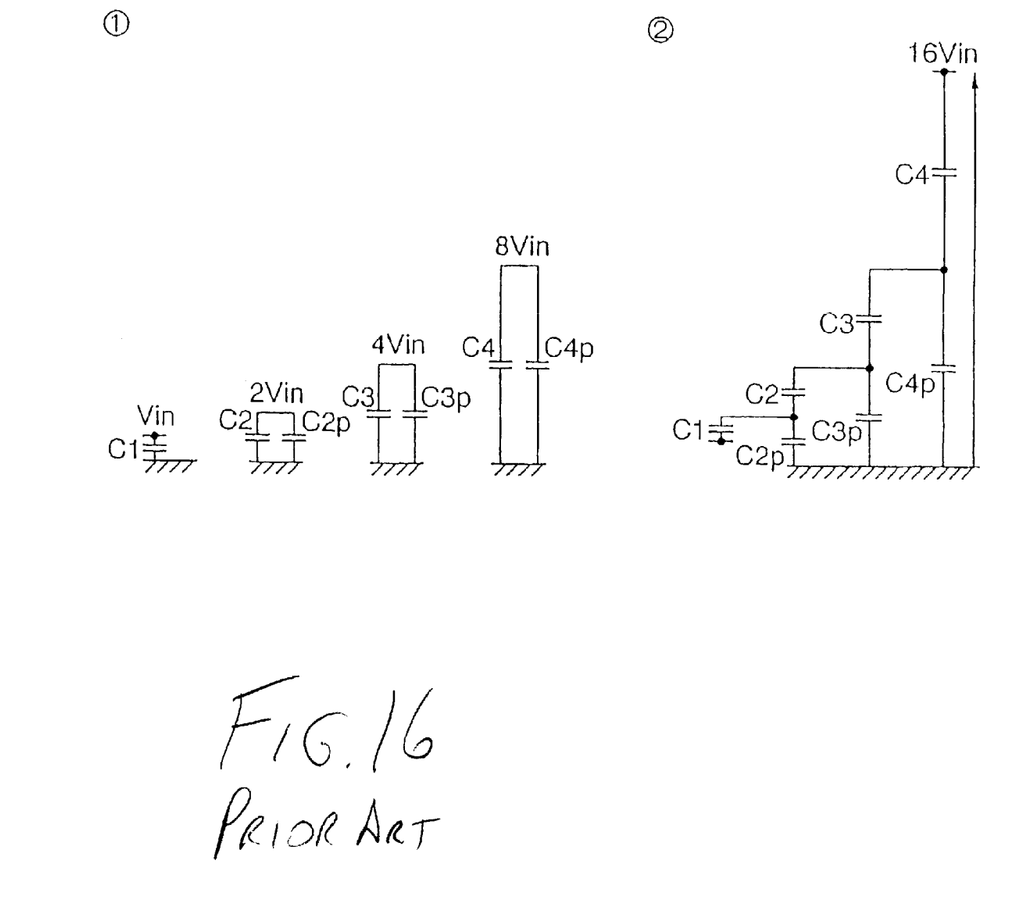
FIG. 16 is an operational view for a 16-times voltage boost in the conventional voltage booster circuit.

To increase the voltage-boost magnification, for example, to set the voltage-boost magnification to 16, seven auxiliary capacitors C1, C2, C2p, C3, C3p, C4, and C4p are used, as shown in FIG. 16. As shown in ① of the figure, the auxiliary capacitor C1 is charged with an input voltage Vin, the auxiliary capacitor C2 is connected in parallel to the auxiliary capacitor C2p which has been charged with 2 Vin in ② and is charged, the auxiliary capacitor C3 is connected in parallel to the auxiliary capacitor C3p which has been charged with 4 Vin in ② and is charged in the same way, and the auxiliary capacitor C4 is connected in parallel to the auxiliary capacitor C4p which has been charged with 8 Vin in ② and is charged in the same way.

As shown in ② of the figure, the auxiliary capacitor C2p is first charged with 2 Vin, which is offset from the input voltage Vin to a higher potential by the output voltage Vin of the auxiliary capacitor C1; secondly, the auxiliary capacitor C3p is charged with 4 Vin, which is offset from a potential of 2 Vin caused by the auxiliary capacitor C1 to a higher potential by the output voltage 2 Vin of the auxiliary capacitor C2; thirdly, the auxiliary capacitor C4p is charged with 8 Vin, which is offset from a potential of 4 Vin caused by the auxiliary capacitor C2 to a higher potential by the output voltage 4 Vin of the auxiliary capacitor C3; and fourthly, a potential of 16 Vin, which is 16 times the input voltage Vin, is obtained by offsetting a potential of 8 Vin caused by the auxiliary capacitor C3 to a higher potential by the output voltage 8 Vin of the auxiliary capacitor C4.

In the conventional voltage booster circuit, however, if the smoothing capacitor Cout is excluded, three capacitors are required for a four-times voltage boost and seven capacitors are required for a 16-times voltage boost. Generally, (2n−1) capacitors are required for a 2n-times voltage boost. When a power-source circuit including a voltage booster circuit is integrated, it is difficult to form capacitive circuits such as capacitors on a semiconductor substrate. Even if such a capacitive circuit can be formed, since it makes the circuit size larger, the number of capacitors required for a voltage boost needs to be reduced as much as possible.

The largest problem in the conventional voltage booster circuit is that it is difficult to control the voltage-boost magnification as required. Therefore, to make the boosted voltage constant at the desired voltage value, a separate constant-voltage circuit such as a switching regulator is required at a later stage in the voltage booster circuit, and accordingly, the scale of the power-source circuit becomes large.

SUMMARY OF THE INVENTION

The present invention provides a voltage booster circuit and a voltage boosting method which allow the number of charge-accumulating devices required for a voltage boost, such as capacitors, to be reduced to simplify the configuration and which allow the voltage-boost magnification to be controlled relatively freely. The invention also provides an electronic unit using the output of the voltage booster circuit as a power source.

To achieve the foregoing, a voltage booster circuit according to the present invention may include a first connector for connecting one terminal of a first charge-accumulating device to a first line having a predetermined potential and for connecting the other terminal of the first charge-accumulating device to a second line having a potential different from that of the first line, a second connector for connecting one terminal of a second charge-accumulating device to the first line, and for switching and connecting the one terminal of the first charge-accumulating device to the second line and for switching and connecting the other terminal of the first charge-accumulating device to the other terminal of the second charge-accumulating device, and a third connector for switching and connecting the one terminal of the second charge-accumulating device to the other terminal of the first charge-accumulating device and for switching and connecting the other terminal of the second charge-accumulating device to an output line.

According to the present invention, since the first charge-accumulating device is connected between the first and the second lines, the other terminal of the first charge-accumulating device has the same potential as the second line when it is assumed that the first line has a reference potential. When the one terminal of the first charge-accumulating device is switched from the first line to the second line, since the potential of the other terminal of the first charge-accumulating device is offset from the potential of the second line in the potential direction opposite to that to the first line by the output voltage of the first charge-accumulating device, which is twice the potential of the second line, and the second charge-accumulating device is charged therewith. When the one terminal of the second charge-accumulating device is switched from the first line to the other terminal of the first charge-accumulating device, and the other terminal of the second charge-accumulating device is switched from the other terminal of the first charge-accumulating device to the output line and connected, the potential of the output line becomes four times the potential of the second line, which is offset from the potential of the other terminal of the first charge-accumulating device, having a potential that is twice the potential of the second line, in the potential direction opposite to that to the first line by the output voltage of the second charge-accumulating device. Therefore, two charge-accumulating devices are required to boost the potential difference between the first and the second lines four times, and thus the configuration is simplified. In other words, although charge-accumulating devices, such as capacitors need a large area when integrated and are difficult to form, since the number of required charge-accumulating devices is reduced according to the present invention, the configuration can be simplified. Such a configuration can be used in a case when the first line has a higher potential than the second line as well as in a case when the first line has a lower potential than the second line. The reference potential may be the potential of the first line or that of the second line.

It is preferred that the voltage booster circuit according to the present invention further include a fourth connector for connecting the one terminal of the second charge-accumulating device to the first line and for connecting the other terminal to the second line, and a controller for exclusively controlling the connection of the second charge-accumulating device established by the second connector and the connection of the second charge-accumulating device established by the fourth connector.

With this configuration, if the controller controls such that the connection period of the second charge-accumulating device established by the second connector is set to the entire period and the connection period of the second charge-accumulating device established by the fourth connector is set to zero, the potential of the output line becomes four times the potential of the second line as described above. On the other hand, if the controller controls such that the connection period of the second charge-accumulating device established by the second connector is set to zero and the connection period of the second charge-accumulating device established by the fourth connector is set to the entire period, since the output voltage of the second charge-accumulating device becomes equal to, not two times, the potential difference between the first line and the second line, the potential of the output line becomes three times the potential of the second line. Therefore, when the potential of the output line is smoothed with the connection-period ratio being controlled, the voltage-boost magnification can be varied to any value between three and four.

In this case, it is preferred that the controller control such that the connection period of the second charge-accumulating device established by the second connector is longer than the connection period of the second charge-accumulating device established by the fourth connector when the potential of the second line or a potential according to the output line is lower in absolute values than a predetermined value. With this control, the potential of the output line can be made constant between three times and four times the potential of the second line.

It is preferred that the voltage booster circuit according to the present invention further include a fifth connector for connecting the other terminal of the first charge-accumulating device to the output line while the one terminal of the first charge-accumulating device is being connected to the second line, and a controller for exclusively controlling the connection of the second charge-accumulating device established by the second or fourth connector and the connection established by the fifth connector.

With this configuration, if the controller controls such that the connection period of the second charge-accumulating device established by the second or the fourth connector is set to the entire period and the connection period of the second charge-accumulating device established by the fifth connector is set to zero, the potential of the output line becomes four times or three times the potential of the second line as described above. On the other hand, if the controller controls such that the connection period of the second charge-accumulating device established by the second or the fourth connector is set to zero and the connection period of the second charge-accumulating device established by the fifth connector is set to the entire period, the output line has the same potential as the other terminal of the first charge-accumulating device, having a potential that is two times the potential of the second line. Therefore, when the potential of the output line is smoothed with the connection-period ratio being controlled, the voltage-boost magnification can be varied to any value between four and two, or between three and two.

In this case, it is preferred that the controller control such that the connection period of the second charge-accumulating device established by the second or fourth connector is longer than the connection period established by the fifth connector when the potential of the second line or a potential according to the output line is lower in absolute values than a predetermined value. With this control, the potential of the output line can be made constant between four times and two times, or between three times and two times the potential of the second line.

In addition, it is preferred that the voltage booster circuit according to the present invention further include a sixth connector for connecting the second line to the output line, and a controller for exclusively controlling the connection of the second charge-accumulating device established by the second or fourth connector or the connection established by the fifth connector, and the connection established by the sixth connector.

With this configuration, if the controller controls such that the connection period of the second charge-accumulating device established by the second or the fourth connector or the connection period established by the fifth connector is set to the entire period and the connection period established by the sixth connector is set to zero, the potential of the output line becomes four times, three times, or two times the potential of the second line as described above. On the other hand, if the controller controls such that the connection period of the second charge-accumulating device established by the second or the fourth connector or the connection period established by the fifth connector is set to zero and the connection period of the second charge-accumulating device established by the sixth connector is set to the entire period, the output line has the same potential as the second line. Therefore, when the potential of the output line is smoothed with the connection-period ratio being controlled, the voltage-boost magnification can be varied to any value between four and one, between three and one, or between two and one.

In this case, it is preferred that the controller control such that the connection period of the second charge-accumulating device established by the second or fourth connector or the connection period established by the fifth connector is longer than the connection period established by the sixth connector when the potential of the second line or the potential according to the output line is lower than a predetermined value in absolute values. With this control, the potential of the output line can be made constant between four times and the same as the potential of the second line, between three times and the same as the potential of the second line, or between two times and the same as the potential of the second line.

To achieve the foregoing, a voltage booster circuit according to the present invention has at least n (n being an integer of three or greater) charge-accumulating devices and may include a first connector for connecting one terminal of a first charge-accumulating device to a first line having a predetermined potential and for connecting the other terminal of the first charge-accumulating device to a second line having a potential different from that of the first line, a second connector for connecting one terminal of a second charge-accumulating device to the first line, and for switching and connecting the one terminal of the first charge-accumulating device to the second line and for switching and connecting the other terminal of the first charge-accumulating device to the other terminal of the second charge-accumulating device, a third to n-th connectors for connecting one terminal of a m-th (m being an integer satisfying $3 \leq m \leq n$) charge-accumulating device to the first line, and for switching and connecting the one terminal of the (m−1)-th charge-accumulating device to the other terminal of the (m−2)-th charge-accumulating device and for switching and connecting the other terminal of the (m−1)-th charge-accumulating device to the other terminal of the m-th charge-accumulating device, and an (n+1)-th connector for switching and connecting the one terminal of the n-th charge-accumulating device to the other terminal of the (n−1)-th charge-accumulating device and for switching and connecting the other terminal of the n-th charge-accumulating device to an output line.

Assuming that "n" is set to four, for example, since the first charge-accumulating device is connected between the first and the second lines, the other terminal of the first charge-accumulating device has the same potential as the second line. Then, when the one terminal of the first charge-accumulating device is switched to the second line, the potential of the other terminal of the first charge-accumulating device is two times the potential of the second line, and the second charge-accumulating device is charged therewith. Then, when the one terminal of the second charge-accumulating device is switched to the other terminal of the first charge-accumulating device, the potential of the other terminal of the second charge-accumulating device becomes four times the potential of the second line, and the third charge-accumulating device is charged therewith. Then, when the one terminal of the third charge-accumulating device is switched to the other terminal of the second charge-accumulating device, the potential of the other terminal of the third charge-accumulating device becomes eight times the potential of the second line, and the fourth charge-accumulating device is charged therewith. Then, when the one terminal of the fourth charge-accumulating device is switched to the other terminal of the third charge-accumulating device, the potential of the other terminal of the fourth charge-accumulating device becomes 16 times the potential of the second line. Therefore, when "n" is set to four, four charge-accumulating devices are required to boost the potential difference between the first and the second lines $2^4$=16 times, and thus the configuration is simplified. In other words, when "n" is set to an integer of three or more, n charge-accumulating devices are required to boost the potential difference between the first and the second lines $2^n$ times, and especially when "n" is set to a large integer, the present invention is convenient to simplify the configuration.

In addition, to achieve the foregoing, a voltage boosting method according to the present invention may include a first step of connecting one terminal of a first charge-accumulating device to a first line having a predetermined potential and of connecting the other terminal of the first charge-accumulating device to a second line having a potential different from that of the first line, a second step of connecting one terminal of a second charge-accumulating device to the first line, and of switching and connecting the one terminal of the first charge-accumulating device to the second line and of switching and connecting the other terminal of the first charge-accumulating device to the other terminal of the second charge-accumulating device, and a third step of switching and connecting the one terminal of the second charge-accumulating device to the other terminal of the first charge-accumulating device and of switching and connecting the other terminal of the second charge-accumulating device to an output line.

In the same way, to achieve the foregoing, a voltage boosting method according to the present invention using at least n (n being an integer of three or greater) charge-accumulating devices may include a first step of connecting one terminal of a first charge-accumulating device to a first line having a predetermined potential and of connecting the other terminal of the first charge-accumulating device to a second line having a potential different from that of the first line, a second step of connecting one terminal of a second charge-accumulating device to the first line, and of switching and connecting the one terminal of the first charge-accumulating device to the second line and of switching and connecting the other terminal of the first charge-accumulating device to the other terminal of the second charge-accumulating device, a third to n-th steps of connecting one terminal of a m-th (m being an integer satisfying 3≦m≦n) charge-accumulating device to the first line, and of switching and connecting the one terminal of the (m−1)-th charge-accumulating device to the other terminal of the (m−2)-th charge-accumulating device and of switching and connecting the other terminal of the (m−1)-th charge-accumulating device to the other terminal of the m-th charge-accumulating device, and an (n+1)-th step of switching and connecting the one terminal of the n-th charge-accumulating device to the other terminal of the (n−1)-th charge-accumulating device and of switching and connecting the other terminal of the n-th charge-accumulating device to an output line.

Furthermore, to achieve the foregoing, an electronic unit according to the present invention may include a first connector for connecting one terminal of a first charge-accumulating device to a first line having a predetermined potential and for connecting the other terminal of the first charge-accumulating device to a second line having a potential different from that of the first line, a second connector for connecting one terminal of a second charge-accumulating device to the first line, and for switching and connecting the one terminal of the first charge-accumulating device to the second line and for switching and connecting the other terminal of the first charge-accumulating device to the other terminal of the second charge-accumulating device, and a third connector for switching and connecting the one terminal of the second charge-accumulating device to the other terminal of the first charge-accumulating device and for switching and connecting the other terminal of the second charge-accumulating device to an output line, and a potential according to the output line is used as a power source.

In the same way, to achieve the foregoing, an electronic unit according to the present invention has at least n (n being an integer of three or greater) charge-accumulating devices, may include a first connector for connecting one terminal of a first charge-accumulating device to a first line having a predetermined potential and for connecting the other terminal of the first charge-accumulating device to a second line having a potential different from that of the first line, a second connector for connecting one terminal of a second charge-accumulating device to the first line, and for switching and connecting the one terminal of the first charge-accumulating device to the second line and for switching and connecting the other terminal of the first charge-accumulating device to the other terminal of the second charge-accumulating device, a third to n-th connector for connecting one terminal of a m-th (m being an integer satisfying 3≦m≦n) charge-accumulating device to the first line, and for switching and connecting the one terminal of the (m−1)-th charge-accumulating device to the other terminal of the (m−2)-th charge-accumulating device and for switching and connecting the other terminal of the (m−1)-th charge-accumulating device to the other terminal of the m-th charge-accumulating device; and an (n+1)-th connector for switching and connecting the one terminal of the n-th charge-accumulating device to the other terminal of the (n−1)-th charge-accumulating device and for switching and connecting the other terminal of the n-th charge-accumulating device to an output line, and a potential according to the output line is used as a power source.

DETAILED DESCRIPTION OF PREFERRED EMBODIMENTS

Embodiments of the present invention will be described below.

Figure 1:
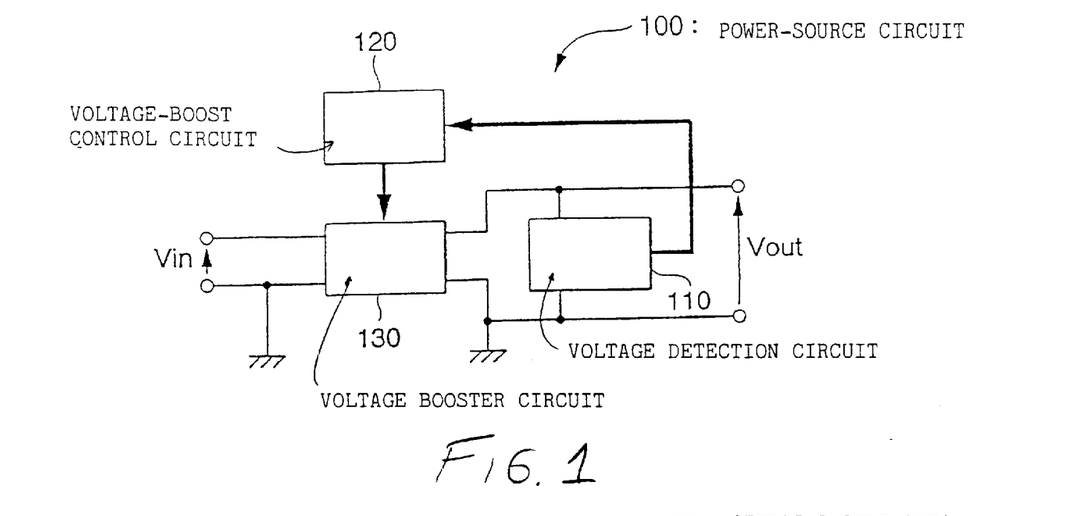
FIG. 1 is a block diagram showing a power-source circuit to which a voltage booster circuit according to a first embodiment of the present invention is applied.

A first embodiment, which shows a fundamental configuration of the present invention, will be described first. FIG. 1 is a block diagram showing the configuration of a power-source circuit to which a voltage booster circuit according to the present invention is applied. As shown in this figure, a power-source circuit 100 is formed of a voltage detection circuit 110, a voltage-boost control circuit 120, and a voltage booster circuit 130. Among these, the voltage detection circuit 110, for example, detects the output voltage Vout of the voltage booster circuit 130 and sends the detection result to the voltage-boost control circuit 120. The voltage-boost control circuit 120 generates control signals "a," "b," "c1," "c2," and "d" used for controlling the voltage-boost magnification of the voltage booster circuit 130 according to the output voltage Vout detected by the voltage detection circuit 110.

Figure 2:
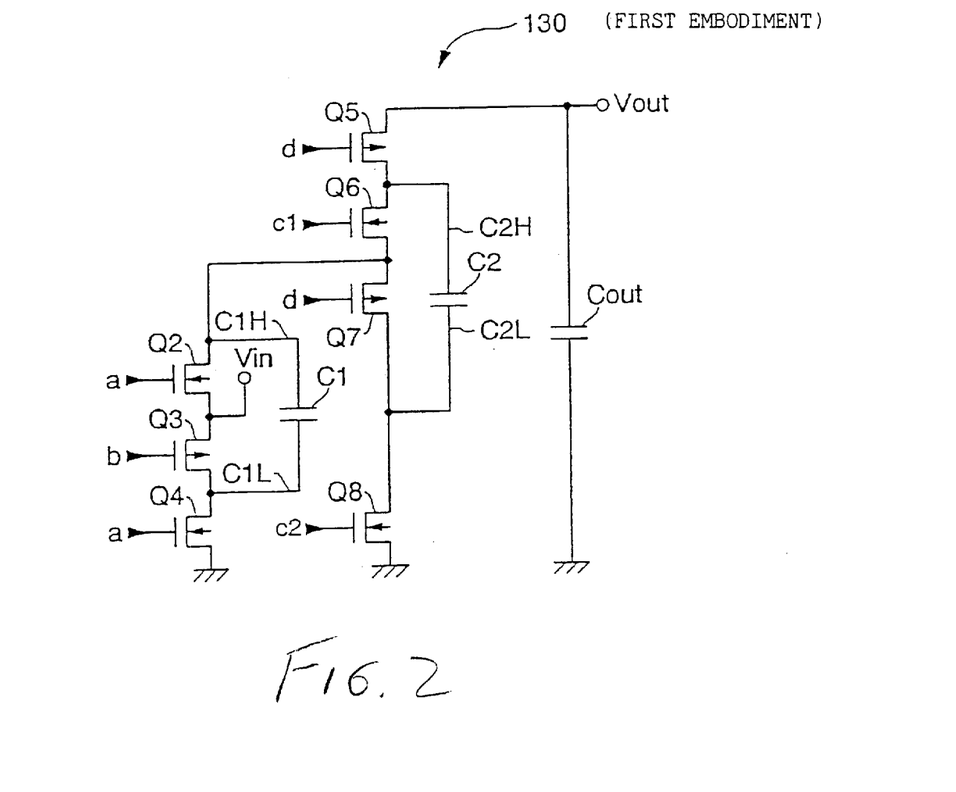
FIG. 2 is a circuit diagram showing the configuration of the voltage booster circuit.

A detailed configuration of the voltage booster circuit 130 will be described below by referring to FIG. 2. The voltage booster circuit 130 boosts an input voltage Vin between once and four times and outputs the output voltage Vout according to the control signals "a," "b," "c1," "c2," and "d" generated by the voltage-boost control circuit 120. The voltage booster circuit 130 is formed of transistors Q2 to Q8 serving as switching devices, auxiliary capacitors C1 (first charge-accumulating device) and C2 (second charge-accumulating device), and an output capacitor Cout.

To describe the configuration in detail, one terminal C1L of the auxiliary capacitor C1 is connected to a ground line (first line) having a reference potential through an n-channel transistor Q4 having the control signal "a" as a gate signal, and is also connected to the supply line (second line) of the input voltage Vin through a p-channel transistor Q3 having the control signal "b" as a gate signal.

On the other hand, the other terminal C1H of the auxiliary capacitor C1 is connected as described below. The terminal C1H is first connected to the supply line of the input voltage Vin through an n-channel transistor Q2 having the control signal "a" as a gate signal; is secondly connected to one terminal C2L of the auxiliary capacitor C2 through a p-channel transistor Q7 having the control signal "d" as a gate signal, and is further connected to the ground line through an n-channel transistor Q8 having the control signal "c2" as a gate signal; and is thirdly connected to the other terminal C2H of the auxiliary capacitor C2 through an n-channel transistor Q6 having the control signal "c1" as a gate signal, and is further connected to the output line of the output voltage Vout through a p-channel transistor Q5 having the control signal "d" as a gate signal.

The output capacitor Cout is connected in parallel between the output line and the ground line in order to smooth the output voltage Vout.

The operation of the power-source circuit 100 having the above configuration will be described next. The voltage-boost control circuit 120 essentially controls the voltage-boost magnification of the voltage booster circuit 130 in any range according to the output voltage Vout, but for the sake of convenience, the operation of the power-source circuit 100 will be described for each of the cases in which the voltage-boost magnification is set to four, three, two, and one, and then for a case in which the voltage-boost magnification is set to any value.

The operation will be described first for a case in which the voltage-boost magnification of the voltage-boost circuit 130 is set to four. In this case, the voltage-boost control circuit 120 generates control signals "a," "b," "c1" "c2," and "d" as shown by a timing chart illustrated in FIG. 3. As shown in the figure, the control signal "a" is formed by narrowing the pulse width of the control signal "b." The control signals "c1" and "c2" are formed by inverting the control signal "b" and scaling it down by a factor of 2 (thinning the number of pulse to ½). The control signal "d" is formed by inverting the control signal "c1" or "c2" and delaying it by half the period.

Figure 5:
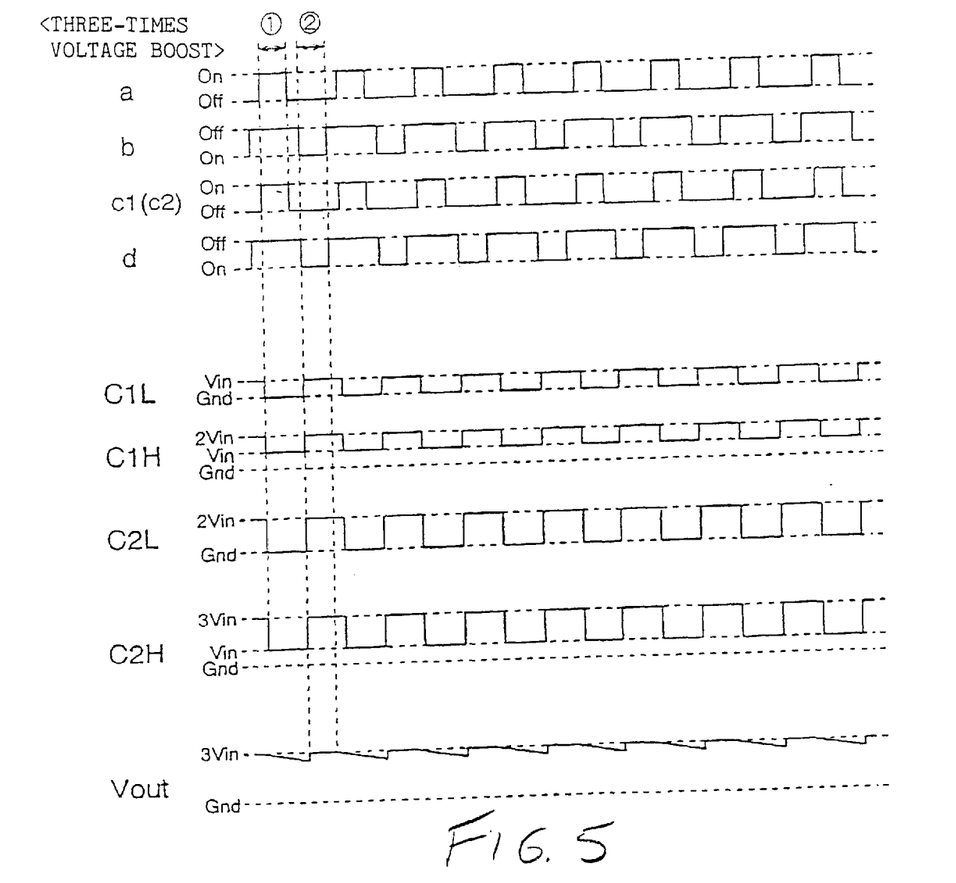
FIG. 5 is a timing chart showing control signals for a three-times voltage boost in the voltage booster circuit.
Figure 6:
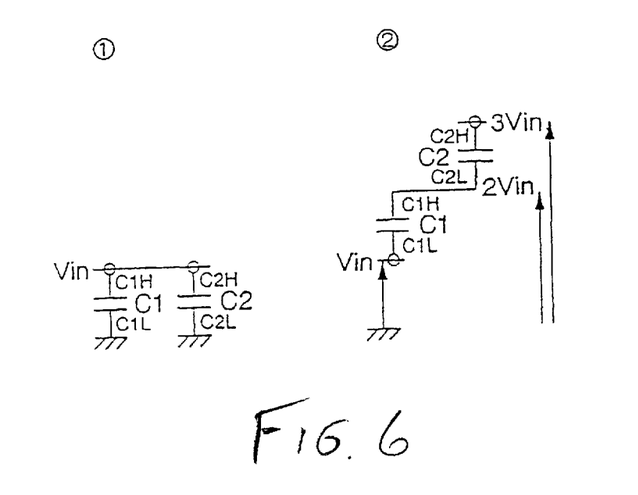
FIG. 6 is an operational view for the three-times voltage boost in the voltage booster circuit.

When these control signals are sent to the voltage booster circuit 130, the transistors Q2, Q4, Q6, and Q8 are turned on whereas the other transistors are all turned off in a period indicated by ① in FIG. 5, namely, in a period when all the control signals "a," "b," "c1," "c2," and "d" have an "H" level. Therefore, since the auxiliary capacitors C1 and C2 are connected in parallel such that the terminal C1H and the terminal C2H are connected to the supply line of the input voltage Vin and the terminal C1L and the terminal C2L are connected to the ground line, as indicated by ① in FIG. 6, the auxiliary capacitors C1 and C2 are charged with the input voltage Vin. After this operation, the transistors Q2 to Q4 are all turned off temporarily.

Figure 3:
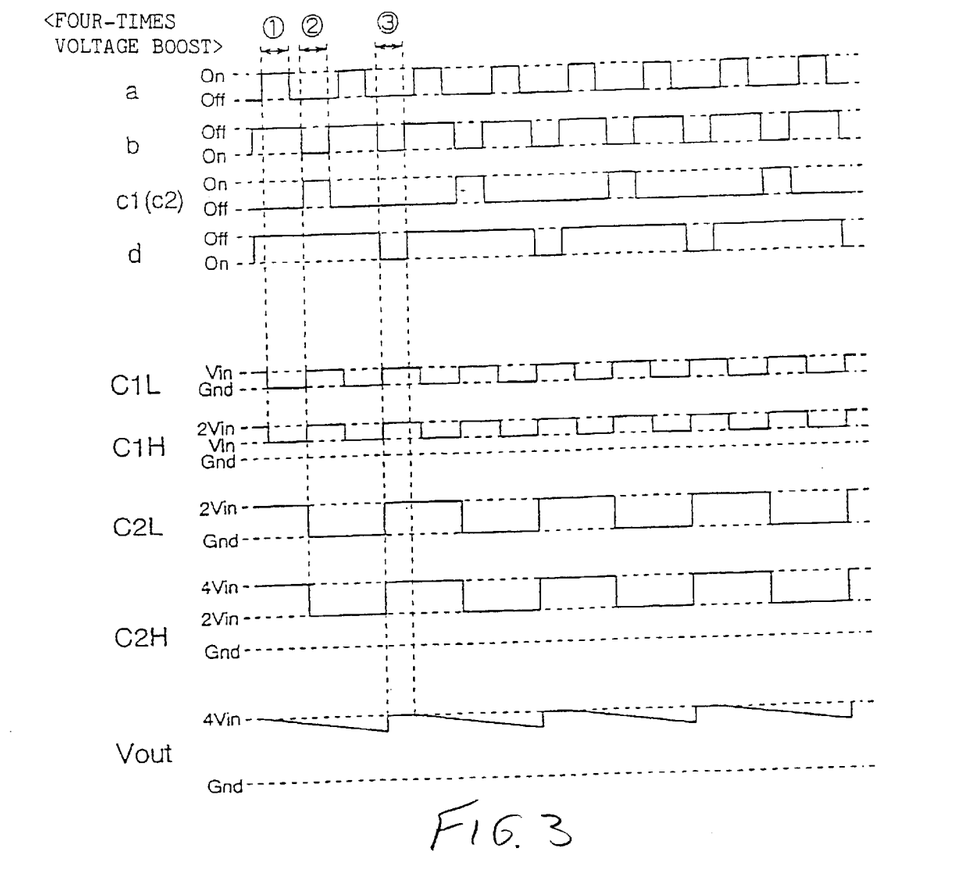
FIG. 3 is a timing chart showing control signals for a four-times voltage boost in the voltage booster circuit.
Figure 4:
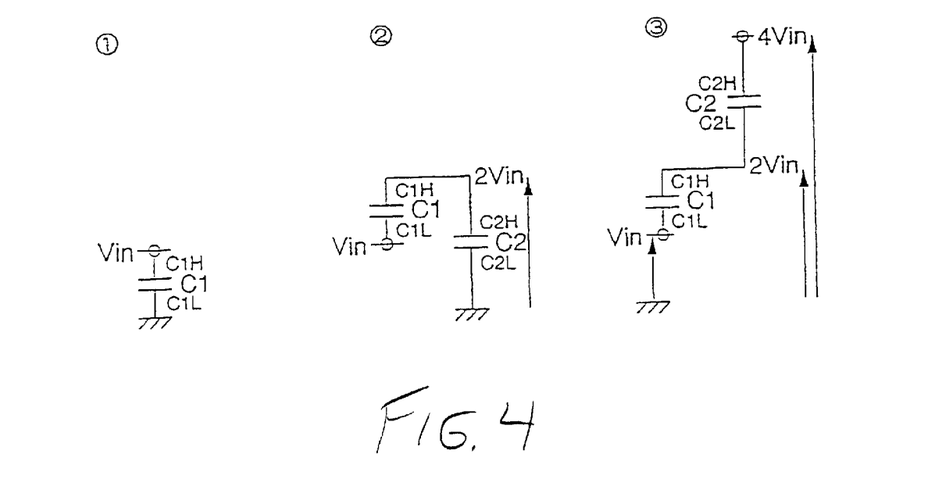
FIG. 4 is an operational view for the four-times voltage boost in the voltage booster circuit.

In a period indicated by ② in FIG. 3, namely, in a period when the control signals "c1," "c2," and "d" have an "H" level and the control signals "a" and "b" have an "L" level, the transistors Q3, Q6, and Q8 are turned on whereas the other transistors are all turned off. Therefore, since the terminal C1L of the auxiliary capacitor C1 is connected to the supply line of the input voltage Vin and the terminal C1H is disconnected from the supply line of the input voltage Vin, as indicated by ② in FIG. 4, the potential of the terminal C1H becomes 2 Vin, which is offset from the input voltage Vin to a higher potential by the output voltage Vin of the auxiliary capacitor C1. On the other hand, since the terminal C2H of the auxiliary capacitor C2 is connected to the terminal C1H and the terminal C2L is connected to the ground line, the auxiliary capacitor C2 is charged with 2 Vin, which is the potential difference between both terminals. After this operation, the transistors Q2 to Q8 are all turned off temporarily.

In a period indicated by ③ in FIG. 3, namely, in a period when all the control signals "a," "b," "c1," "c2," and "d" have an "L" level, the transistors Q3, Q5, and Q7 are turned on whereas the other transistors are all turned off. Therefore, while the terminal C1L of the auxiliary capacitor C1 is connected to the supply line of the input voltage Vin, the terminal C1H is connected to the terminal C2L and the terminal C2H is connected to the output line of the output voltage Vout, as indicated by ③ in FIG. 4. Consequently, the potential of the terminal C2H becomes 4 Vin, which is offset from the potential of the terminal C1H (C2L), 2 Vin, to a higher potential by the output voltage 2 Vin of the auxiliary capacitor C2, and then, it is smoothed by the output capacitor Cout. When a load is connected to the output line, since the output capacitor Cout is discharged continuously, the output voltage Vout is gradually reduced from 4 Vin in a period from when the transistor Q5 is turned off to when it is turned on.

As described above, the periods ①, ②, and ③ are repeated to boost the input voltage Vin four times and to output it.

The operation of the power-source circuit 100 will be described next for a case in which the voltage-boost magnification of the voltage-boost circuit 130 is set to three. In this case, the voltage-boost control circuit 120 generates control signals "a," "b," "c1," "c2," and "d" shown in a timing chart illustrated in FIG. 5. As shown in the figure, the control signals "a" and "b" are the same as those used in the four-times voltage boost. The control signals "c1" and "c2" are the same as the control signal "a," and, in the same way, the control signal "d" is the same as the control signal "b".

When these control signals are sent to the voltage booster circuit 130, the transistors Q2, Q4, Q6, and Q8 are turned on whereas the other transistors are all turned off in a period indicated by ① in FIG. 5, namely, in a period when all the control signals "a," "b," "c1," "c2," and "d" have an "H" level. Therefore, since the auxiliary capacitors C1 and C2 are connected in parallel such that the terminal C1H and the terminal C2H are connected to the supply line of the input voltage Vin and the terminal C1L and the terminal C2L are connected to the ground line, as indicated by ① in FIG. 6, the auxiliary capacitors C1 and C2 are charged with the input voltage Vin. After this operation, the transistors Q2 to Q8 are all turned off temporarily.

In a period indicated by ② in FIG. 5, namely, in a period when all the control signals "a," "b," "c1," "c2," and "d" have an "L" level, the transistors Q3, Q5, and Q7 are turned on whereas the other transistors are all turned off. Therefore, since the terminal C1L of the auxiliary capacitor C1 is connected to the supply line of the input voltage Vin, as indicated by ② in FIG. 6, the potential of the terminal C1H becomes 2 Vin, which is offset from the input voltage Vin to a higher potential by the output voltage Vin of the auxiliary capacitor C1. In addition, in this condition, since the terminal C1H is connected to the terminal C2L of the auxiliary capacitor C2 and the terminal C2H is connected to the output line of the output voltage Vout, the potential of the terminal C2H becomes 3 Vin, which is offset from the potential of the terminal C1H (C2L), 2 Vin, to a higher potential by the output voltage Vin of the auxiliary capacitor C2. When a load is being connected to the output line, since the output capacitor Cout is discharged continuously, the output voltage Vout is gradually reduced from 3 Vin in a period from when the transistor Q5 is turned off to when it is turned on.

As described above, the periods ① and ② are repeated to boost the input voltage Vin three times and to output it.

The operation of the power-source circuit 100 will be described next for a case in which the voltage-boost magnification of the voltage-boost circuit 130 is set to two. In this case, the voltage-boost control circuit 120 generates control signals "a," "b," "c1," "c2," and "d" shown in a timing chart illustrated in FIG. 7. As shown in the figure, the control signals "a" and "b" are the same as those used in the four-times and three-times voltage boosts. The control signal "c1" is formed by inverting the control signal "b." The control signal "c2" always has an "L" level. The control signal "d" is the same as the control signal "b."

Figure 7:
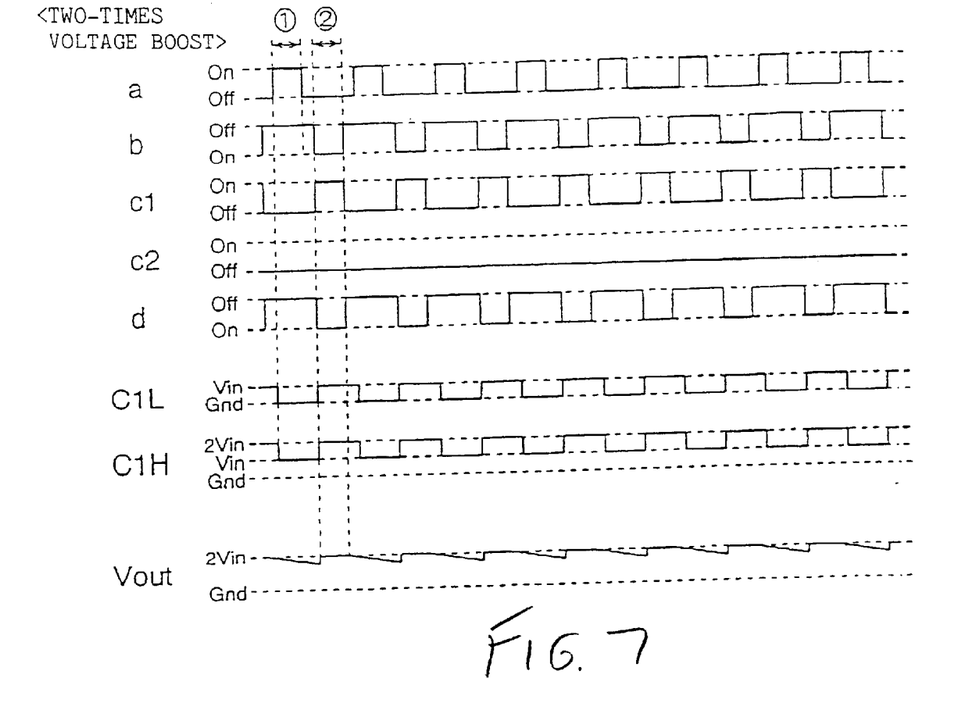
FIG. 7 is a timing chart showing control signals for a two-times voltage boost in the voltage booster circuit.

When these control signals are sent to the voltage booster circuit 130, the transistors Q2 and Q4 are turned on whereas the other transistors are all turned off in a period indicated by ① in FIG. 7, namely, in a period when the control signals "a," "b," and "d" have an "H" level except for the control signal "c1" and "c2", as in the period indicated by ① in the four-times voltage boost. Therefore, as shown in ① in FIG. 8, the auxiliary capacitor C1 is charged with the input voltage Vin. After this operation, the transistors Q2 to Q8 are all turned off temporarily.

In a period indicated by ② in FIG. 7, namely, in a period when the control signals "c1" has an "H" level and the control signals "a," "b," "c2," and "d" have an "L" level, the transistors Q3, Q5, Q6, and Q7 are turned on whereas the other transistors are all turned off. Therefore, as shown in ② in FIG. 8, since the terminal C1L of the auxiliary capacitor C1 is connected to the supply line of the input voltage Vin and the terminal C1H is connected to the output line of the output voltage Vout, the output voltage Vout becomes 2 Vin, which is offset from the input voltage Vin to a higher potential by the output voltage Vin of the auxiliary capacitor C1.

Figure 8:
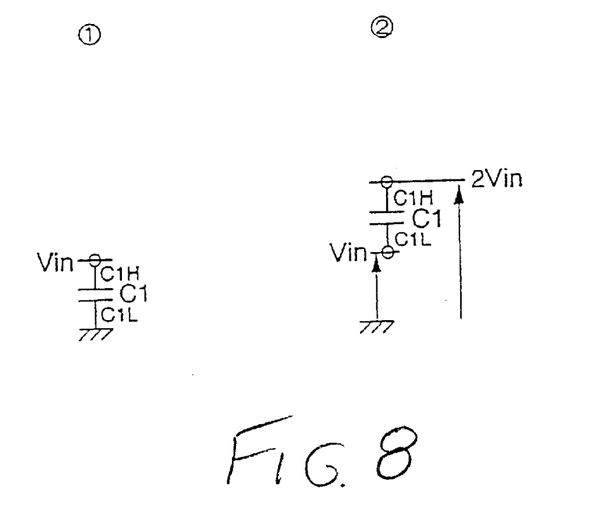
FIG. 8 is an operational view for the two-times voltage boost in the voltage booster circuit.

In this period, since the terminal C2L and the terminal C2H are short-circuited, the auxiliary capacitor C2 is not charged. When a load is connected to the output line, since the output capacitor Cout is discharged continuously, the output voltage Vout is gradually reduced from 2 Vin in a period from when the transistor Q5 is turned off to when it is turned on.

As described above, the periods ① and ② are repeated to boost the input voltage Vin twice and to output it.

The operation of the power-source circuit 100 will be described next for a case in which the voltage-boost magnification of the voltage-boost circuit 130 is set to one. In this case, the voltage-boost control circuit 120 generates control signals "a," "b," "c1," "c2," and "d" shown in a timing chart illustrated in FIG. 9. As shown in the figure, the control signal "a" is the same as that used in the four-times, three-times, and two-times voltage boosts. The control signal "b" always has an "H" level. The control signal "c1" is the same as the control signal "a". The control signal "c2" always has a "L" level. The control signal "d" is formed by inverting the control signal "a" or "c1".

Figure 9:
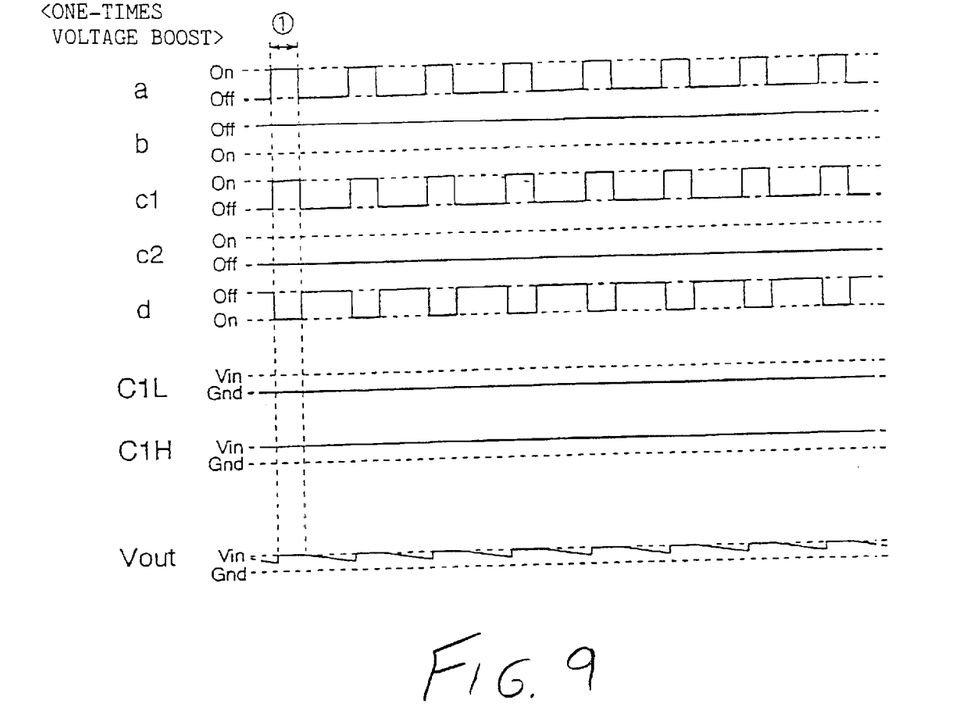
FIG. 9 is a timing chart showing control signals for a one-times voltage boost in the voltage booster circuit.

When these control signals are sent to the voltage booster circuit 130, the transistors Q2, Q4, Q5, Q6, and Q7 are turned on whereas the other transistors are all turned off in a period indicated by ① in FIG. 9, namely, in a period when the control signals "a" and "b" have an "H" level and the control signal "d" has an "L" level. Therefore, since the supply line of the input voltage Vin is connected to the output line, the input voltage Vin is output as the output voltage Vout. In this period, since the terminal C2L and the terminal C2H are short-circuited, the auxiliary capacitor C2 is not charged. When a load is being connected to the output line, since the output capacitor Cout is discharged continuously, the output voltage Vout is gradually reduced from Vin in a period from when the transistor Q5 is turned off to when it is turned on.

As described above, with the period ①, the input voltage Vin is output as the output voltage Vout.

As described above, the voltage booster circuit in the present embodiment allows four-times, three-times, two-times, and one-times voltage boosts. In addition to these voltage-boost magnifications, the magnification is actually allowed to be changed to any value between four and one. In other words, the voltage-boost control circuit 120 sends control signals for different voltage-boost magnifications in a time-division manner and controls the ratio of the supply periods to allow the voltage-boost magnification to be set to a value between the different magnifications.

When the control signals for the four-times voltage boost and the control signals for the three-times voltage boost are alternately sent for the same period of time, for example, the output voltage Vout, which is smoothed by the output capacitor Cout, is set to 3.5-times the input voltage Vin, which results in the voltage-boost magnification being substantially set to 3.5. When the control signals for the four-times voltage boost and the control signals for the three-times voltage boost are alternately sent with respective supply-period ratios of 25% and 75%, for example, the voltage-boost magnification is substantially set to 3.25. In either case, since the control signals "a" and "b" are used in common, only the control signal "c1" ("c2") and the control signal "d" need to be changed.

In the present embodiment, as described above, since the connections of the auxiliary capacitors C1 and C2 are controlled in a time-division manner to obtain each of voltages 4 Vin, 3 Vin, 2 Vin, and Vin, controlling the supply-period ratio of the control signals results in exclusively controlling the connection patterns required to obtain each voltage in a time-division manner.

To set the voltage-boost magnification between four and three, a combination of the control signals for the four-times voltage boost and those for the two-times or one-times voltage boost can be used in addition to a combination of the control signals for the four-times voltage boost and those for the three-times voltage boost. To describe this with a voltage-boost magnification of 3.5, described above, taken as an example, the control signals for the four-times voltage boost and those for the two-times voltage boost need to be alternately sent with the respective supply-period ratios of 75% and 25%, or the control signals for the four-times voltage boost and those for the one-times voltage boost need to be alternately sent with the respective supply-period ratios of 83.3% and 16.7%.

To set the voltage-boost magnification between three and two, a combination of the control signals for the four-times voltage boost and those for the two-times or one-times voltage boost or a combination of the control signals for the three-times voltage boost and those for the one-times voltage boost can be used in addition to a combination of the control signals for the three-times voltage boost and those for the two-times voltage boost. In the same way, to set the voltage-boost magnification between two and one, a combination of the control signals for the four-times or three-times voltage boost and those for the one-times voltage boost can be used in addition to a combination of the control signals for the two-times voltage boost and those for the one-times voltage boost. When control signals for voltage boosts having a large voltage-boost difference are combined, since the output capacitor Cout smooths voltages having a large potential difference, it is noted that the ripple of the output voltage becomes large.

Such a control is actually performed in the following way. When the output voltage Vout is higher in absolute values than the target voltage Vref, the period when the control signals for a higher-magnification voltage boost are sent is set shorter than the period when the control signals for a lower-magnification voltage boost are sent. Conversely, when the output voltage Vout is lower in absolute values than the target voltage Vref, the period when the control signals for a higher-magnification voltage boost are sent is set longer than the period when the control signals for a lower-magnification voltage boost are sent. With this control, the output voltage Vout is balanced with the voltage Vref and is maintained within a certain range.

Therefore, according to this type of control, since the output voltage is made constant by the voltage booster circuit itself, it is advantageous that a constant-voltage circuit is unnecessary in the subsequent stage. In addition, even if the input voltage Vin is, for example, reduced as time goes on, since the output voltage Vout is made constant between Vin and 4 Vin by increasing the voltage-boost magnification, a load is allowed to be operated for an extended period.

In the present embodiment, feedback control is used to make the output voltage Vout constant, in which control signals for each voltage-boost magnification are sent in a time-division manner according to the comparison between the target voltage Vref and the output voltage Vout, and the supply-period ratio is controlled. The present invention is not limited to the use of this control. For example, the voltage-boost control circuit 120 may be configured such that the output voltage Vout is made constant by feed-forward control in which control signals for each voltage-boost magnification are sent in a time-division manner according to the comparison with the input voltage Vin and the supply-period ratio is controlled.

Figure 10:
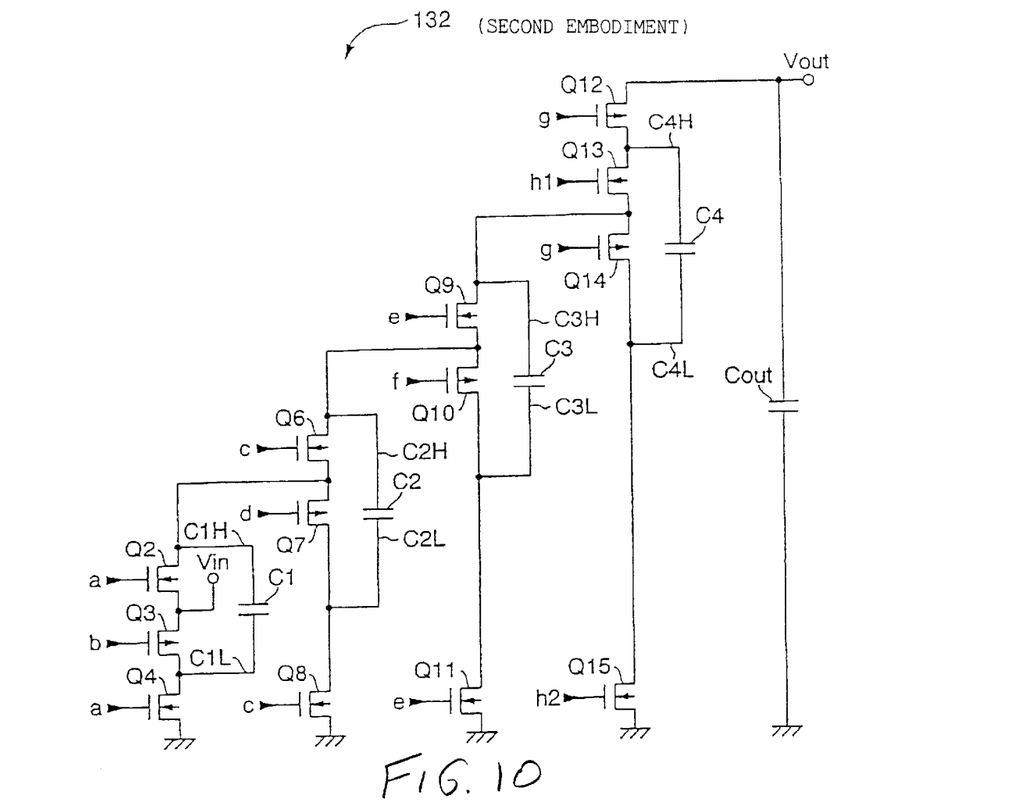
FIG. 10 is a circuit diagram showing the configuration of a voltage booster circuit according to a second embodiment of the present invention.

A voltage booster circuit according to a second embodiment of the present invention will be described next. In the above first embodiment, the voltage-boost magnification is set between four and one, but in the present embodiment, the magnification is set to 16. FIG. 10 is a circuit diagram showing the configuration of a voltage booster circuit 132 in the present embodiment. The voltage booster circuit 132 shown in this figure is used in the power-source circuit 100 instead of the voltage booster circuit 130 shown in FIG. 1. As shown in FIG. 10, the voltage booster circuit 132 is formed by adding auxiliary capacitors C3 and C4 to the voltage booster circuit 130 in the first embodiment. Details will be described next.

Specifically, a terminal C2H of an auxiliary circuit C2 is first connected to one terminal C3L of an auxiliary capacitor C3 through a p-channel transistor Q10 having a control signal "f" as a gate signal and is further connected to a ground line through an n-channel transistor Q11 having a control signal "e" as a gate signal; and is secondly connected to the other terminal C3H of the auxiliary capacitor C3 through an n-channel transistor Q9 having the control signal "e" as a gate signal.

The terminal C3H of the auxiliary capacitor C3 is first connected to one terminal C4L of an auxiliary capacitor C4 through a p-channel transistor Q14 having a control signal "g" as a gate signal and is further connected to the ground line through an n-channel transistor Q15 having a control signal "h2" as a gate signal; and is secondly connected to the other terminal C4H of the auxiliary capacitor C4 through an n-channel transistor Q13 having a control signal "h1" as a gate signal and is further connected to the output line of the output voltage Vout through a p-channel transistor Q12 having the control signal "g" as a gate signal. An output capacitor Cout is connected in parallel between the output line and the ground line to smooth the output voltage Vout, in the same way as in the first embodiment.

When a 16-times voltage boost is performed with such a configuration, the voltage-boost control circuit 120 sends control signals in the following periods ① to ⑤ to control switching of each of the transistors Q2 to Q15 in the voltage booster circuit 132.

Figure 11:
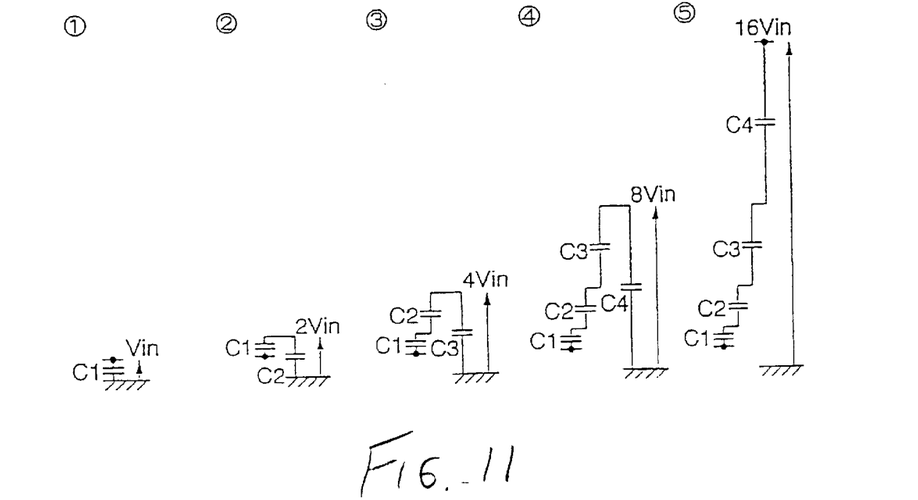
FIG. 11 is an operational view for a 16-times voltage boost in the voltage booster circuit.

Specifically, the voltage-boost control circuit 120 first connects the terminal C1H to the supply line of the input voltage Vin and also connects the terminal C1L to the ground line as indicated in ① in FIG. 11. With this operation, the auxiliary capacitor C1 is charged with Vin.

Secondly, the voltage-boost control circuit 120 connects the terminal C1L to the supply line of the input voltage Vin, the terminal C1H to the terminal C2H, and then the terminal C2L to the ground line as indicated in ② in the figure. With this operation, the potential of the terminal C1H becomes 2 Vin, which is offset from the input voltage Vin to a higher potential by the output voltage Vin of the auxiliary capacitor C1, and the auxiliary capacitor C2 is charged with 2 Vin.

Thirdly, the voltage-boost control circuit 120 connects the terminal C1H to the terminal C2L, the terminal C2H to the terminal C3H, and then the terminal C3L to the ground line while the terminal C1L is connected to the supply line of the input voltage Vin, as indicated in ③ in the figure. With this operation, the potential of the terminal C2H becomes 4 Vin, which is offset from the potential 2 Vin of the terminal C1H (C2L) to a higher potential by the output voltage 2 Vin of the auxiliary capacitor C2, and the auxiliary capacitor C3 is charged with 4 Vin.

Fourthly, the voltage-boost control circuit 120 connects the terminal C2H to the terminal C3L, the terminal C3H to the terminal C4H, and then the terminal C4L to the ground line while the terminal C1L is connected to the supply line of the input voltage Vin and the terminal C1H is connected to the terminal C2L, as indicated in ④ in the figure. With this operation, the potential of the terminal C3H becomes 8 Vin, which is offset from the potential 4 Vin of the terminal C2H (C3L) to a higher potential by the output voltage 4 Vin of the auxiliary capacitor C3, and the auxiliary capacitor C4 is charged with 8 Vin.

Fifthly, the voltage-boost control circuit 120 connects the terminal C3H to the terminal C4L and the terminal C4H to the output line of the output voltage Vout while the terminal C1L is connected to the supply line of the input voltage Vin, the terminal C1H is connected to the terminal C2L, and the terminal C2H is connected to the terminal C3L, as indicated in ⑤ in the figure. With this operation, the potential of the output line becomes 16 Vin, which is offset from the potential 8 Vin of the terminal C3H (C4L) to a higher potential by the output voltage 8 Vin of the auxiliary capacitor C4. In this way, a 16-times voltage boost is performed with the four auxiliary capacitors C1 to C4.

As an extension of the first embodiment, the auxiliary capacitors C1 to C4 can be charged with the following potentials in the present embodiment.

Specifically, the auxiliary capacitor C1 can be charged with Vin, the auxiliary capacitor C2 can be charged with Vin or 2 Vin, the auxiliary capacitor C3 is charged with Vin, 2 Vin, 3 Vin, or 4 Vin, and the auxiliary capacitor C4 can be charged with 0, Vin, 2 Vin, . . . , 7 Vin, and 8 Vin. Therefore, the supply line of the input voltage Vin is offset by the output voltage obtained by appropriately combining the auxiliary capacitors C1 to C4 to allow an output voltage Vout of Vin, 2 Vin, 3 Vin, . . . , or 16 Vin to be obtained.

In addition, the voltage-boost control circuit 120 sends control signals specifying each voltage-boost magnification in a time-division manner and controls the supply-period ratio to allow the voltage-boost magnification to be controlled at any value between 16 and one. Furthermore, the voltage-boost control circuit 120 controls the supply-period ratio according to the result of comparison between the output voltage Vout and the target voltage Vref to allow the output voltage Vout to be made constant between 16 Vin and Vin.

Furthermore, in the present invention, the first and second embodiment are extended, namely, auxiliary capacitors are added in the same way, to allow the input voltage Vin to be boosted 32 times, 64 times, . . . , and 2" times. In this case, since n auxiliary capacitors are required for a voltage boost, the configuration can be simplified. In addition, the voltage-boost magnification can be set to any value between 2" and one, and further, the output voltage Vout can be made constant therebetween.

In the above first and second embodiments, auxiliary capacitors are used for charging and offsetting. In the present invention, devices are not limited to auxiliary capacitors. Secondary cells, for example, may be used.

In the first and second embodiments, a positive power source is described in which the input voltage Vin is set to be in a positive side of the reference potential and the offset direction is set to the positive direction. The present invention is not limited to this case. The present invention can also be applied to a negative power source in which the input voltage is set to be in the negative side of the reference potential and the offset direction is set to the negative direction.

Additionally, in the first and second embodiments, the connections and switching of the auxiliary capacitors are performed by transistors. Other various switches such as analog switches and transmission gates may be used.

The voltage booster circuit 130 in the first embodiment, the voltage booster circuit 132 in the second embodiment, and a voltage booster circuit obtained by extending these voltage booster circuits can be used, for example, as a power-source circuit that sends electrical power to each section of a liquid-crystal display apparatus.

Figure 12:
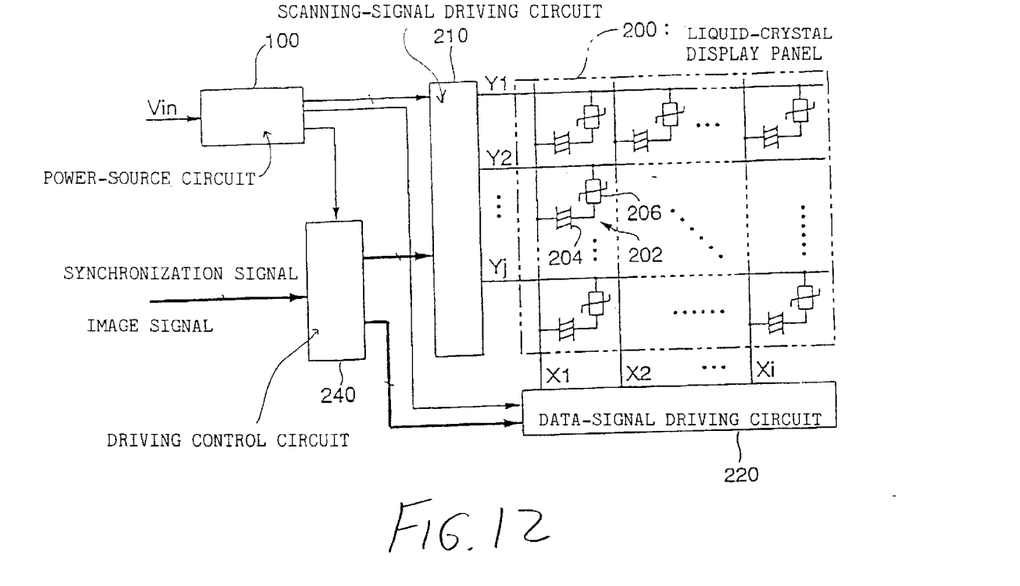
FIG. 12 is a block diagram showing the electrical configuration of a liquid-crystal display apparatus to which a voltage booster circuit according to an embodiment is applied as a power-source circuit.

FIG. 12 is a block diagram showing the electrical configuration of this liquid-crystal display apparatus. As shown in the figure, a liquid-crystal display panel 200 has a liquid-crystal device 202 formed at each intersection of i data lines Xl to Xi and j scanning lines Yl to Yj. Each liquid-crystal device 202 has a configuration in which a liquid-crystal display element (liquid-crystal layer) 204 and a thin-film diode (hereinafter called a TFD) device 206 are connected in series.

The scanning lines Yl to Yj are driven by a scanning-signal driving circuit 210, and the data lines Xl to Xi are driven by a data-signal driving circuit 220. The scanning-signal driving circuit 210 and the data-signal driving circuit 220 are controlled by a driving control circuit 240. In this figure, the TFD device 206 is connected to a scanning line and the liquid-crystal layer 204 is connected to a data line. Conversely, the configuration may be formed such that the TFD device 206 is connected to a data line and the liquid-crystal layer 204 is connected to a scanning line.

A power-source circuit 100 controls the voltage-boost magnification of an input voltage Vin to output various output voltages, such as various selection voltages used in the scanning-signal driving circuit 210, data-signal voltages used in the data-signal driving circuit 220, and voltages used in the driving control circuit 240. The voltage booster circuit 130, described above, is applied to the power-source circuit 100.

With the use of such a power-source circuit 100, even if a load becomes high because the number of pixels to be turned on increases, since the variation of the output voltage is suppressed within a certain range, display quality is prevented from deteriorating. In addition, even if the input voltage Vin decreases as time goes on, since the variation of the output voltage is suppressed within a certain range, the operation time is extended.

As the liquid-crystal display apparatus, various types can be employed such as an active-matrix type using thin-film transistors (TFT) and a passive-matrix type not using switching elements such as TFDs and TFTs. The voltage booster circuit according to the present invention can also be applied to a power-source circuit of an electroluminescence (EL) display apparatus, in addition to that of the liquid-crystal apparatus, in which row electrodes and column electrodes are formed on an insulating layer covering an EL layer. Furthermore, an electronic unit according to the present invention can be applied not only to display apparatuses but also to projectors, personal computers, pagers, liquid-crystal TV sets, viewfinder-type and monitor-view-type video cassette recorders, car-navigation apparatuses, electronic notebooks, electric calculators, wordprocessors, workstations, cellular phones, videophones, POS terminals, and apparatuses having touch-sensitive panels.

As described above, according to the present invention, since only n charge-accumulating devices are required to boost a voltage 2" times, the configuration is simplified and the voltage-boost magnification can be controlled relatively freely.

What is claimed is:

1. A voltage booster circuit that prepares an output voltage using an input voltage applied to an input line and provides the output voltage to an output line, the voltage booster circuit comprising:

J circuit groups arranged in series to each other between the input line and the output line such that each of the J circuit groups includes a charge-accumulating device, a first switch and a second switch, J is equal to or greater than 2, wherein:
the first and second switches in each respective J circuit group from the input line are connected to each other by one terminal of the first switch and one terminal of the second switch,
wherein a first circuit group in the J circuit groups is connected to the input line, and wherein a last circuit group in the J circuit groups is connected to the output line, the other terminal of the first switch in each of the first through J−1 circuit groups is connected to one terminal of the charge-accumulating device in the respective circuit group and to a connection point of the first and second switches in the subsequent series connected circuit group, and the other terminal of the second switch in each of the first through J circuit groups is connected to the other terminal of the charge-accumulating device in the respective circuit group, wherein the first switch in a Kth circuit group within the J circuit groups (where K is an integer equal to or greater than two, but less than J) connects the one terminal of the respective charge-accumulating device and one terminal of the charge-accumulating device in the (K−1)th circuit group, to permit the charge-accumulating device in the Kth circuit group to hold a sum voltage of L voltages held by L charge-accumulating devices in L circuit groups in the J circuit groups, the second switch in the Kth circuit group adds, to a voltage held by the charge-accumulating device in the Kth circuit group, a sum voltage of M voltages held by M charge-accumulating devices in M circuit groups in the J circuit groups, to prepare a plurality of sum voltages that discretely range from a voltage similar to the input voltage to a voltage $2^J$ times as high as the input voltage, J being a positive integer, K being an integer equal to or smaller than J, and L and M being integers equal to or smaller than J, and the output voltage provided by the voltage booster circuit to the output line is selected from any one of a possible plurality of sum voltages within the circuit.

2. A voltage booster circuit as set forth in claim 1, wherein the voltage booster circuit provides a voltage defined between any two adjacent sum voltages of a predetermined plurality of sum voltages.

3. A voltage booster circuit as set forth in claim 2, wherein the voltage booster circuit prepares the predetermined number of sum voltages in a time division manner.

4. A voltage booster circuit as set forth in claim 1, wherein:

each of the J circuit groups further includes a third switch connected by one terminal of the third switch to the other terminal of the charge-accumulating device in the respective circuit group, and connected to ground by the other terminal of the third switch, and the third switch in the Kth circuit group provides conduction of the other terminal of the charge-accumulating device in the Kth circuit group to ground in synchronization with conduction of the first switch in the Kth circuit group, and disconnects conduction of the other terminal of the charge-accumulating device in the Kth circuit group from ground in synchronization with the conduction of the second switch in the Kth circuit group.

5. A power supply comprising:

the voltage booster circuit as set forth in claim 1; and a controller that permits the voltage booster circuit to provide a voltage defined between any two adjacent sum voltages of the plurality of sum voltages.

6. A power supply as set forth in claim 5, wherein the voltage booster circuit prepares the predetermined number of sum voltages in a time division manner.

7. An electronic unit comprising the voltage booster circuit as set forth in claim 1, wherein the electronic unit operates on one of the plurality of sum voltages provided by the voltage booster circuit.

* * * * *